US008906530B2

(12) United States Patent
Inoue

(10) Patent No.: US 8,906,530 B2
(45) Date of Patent: Dec. 9, 2014

(54) BATTERY UNIT WITH BLOWER

(75) Inventor: Yoshimitsu Inoue, Chiryu (JP)

(73) Assignee: Denso Corporation, Kariya (JP)

( * ) Notice: Subject to any disclaimer, the term of this patent is extended or adjusted under 35 U.S.C. 154(b) by 1328 days.

(21) Appl. No.: 12/384,170

(22) Filed: Apr. 1, 2009

(65) Prior Publication Data
US 2009/0253029 A1 Oct. 8, 2009

(30) Foreign Application Priority Data

Apr. 2, 2008 (JP) ................... 2008-096468

(51) Int. Cl.
| H01M 10/60 | (2014.01) |
| H01M 10/613 | (2014.01) |
| H01M 2/02 | (2006.01) |
| H01M 2/34 | (2006.01) |
| H01M 10/615 | (2014.01) |
| H01M 10/617 | (2014.01) |
| H01M 10/652 | (2014.01) |
| H01M 10/6551 | (2014.01) |
| H01M 10/6563 | (2014.01) |
| H01M 10/625 | (2014.01) |
| H01M 10/6553 | (2014.01) |
| H01M 10/6571 | (2014.01) |

(52) U.S. Cl.
CPC ........ *H01M 10/5004* (2013.01); *H01M 2/0237* (2013.01); *H01M 2/348* (2013.01); *H01M 10/5006* (2013.01); *H01M 10/5008* (2013.01); *H01M 10/5038* (2013.01); *H01M 10/5046* (2013.01); *H01M 10/5067* (2013.01); *H01M 10/5016* (2013.01); *H01M 10/5051* (2013.01); *H01M 10/5083* (2013.01)
USPC .......................................... 429/120; 429/99

(58) Field of Classification Search
USPC ........... 429/120, 61–62, 53, 99–100, 72, 121, 429/123, 148–149, 152–154, 156; 29/623.1; 180/65.1, 65.21, 54.1
See application file for complete search history.

(56) References Cited

U.S. PATENT DOCUMENTS 5,663,007 A * 9/1997 Ikoma et al. .................... 429/53
6,111,387 A * 8/2000 Kouzu et al. ................. 320/107
(Continued)

FOREIGN PATENT DOCUMENTS

| JP | 11-7923 | 1/1999 |
| JP | 2003-187767 | 7/2003 |

(Continued)

OTHER PUBLICATIONS

Office action dated Sep. 28, 2010 in corresponding Japanese Application No. 2008-096468.

*Primary Examiner* — Maria J Laios
(74) *Attorney, Agent, or Firm* — Harness, Dickey & Pierce, PLC

(57) ABSTRACT

A battery unit includes a battery housing, a module assembly, electrode portions, fins and a blower. The module assembly includes battery modules having positive terminals and negative terminals. The electrode portions are disposed to connect the positive and negative terminals of the battery modules. The fins are disposed along the electrode portions. The module assembly defines a first surface and a second surface along a stacking direction of the battery modules. The blower is disposed to supply air toward the fins over a range substantially equal to a dimension of the module assembly in the stacking direction. A rotation shaft of the blower is located between a first plane that includes the first surface of the module assembly and a second plane that includes the second surface of the module assembly. The fins have surface areas that increase toward a downstream location with respect to a flow of the air.

18 Claims, 6 Drawing Sheets

(56) References Cited

U.S. PATENT DOCUMENTS

| | | |
|---|---|---|
| 6,783,886 B1 * | 8/2004 | Sakakibara et al. ............ 429/99 |
| 7,531,270 B2 * | 5/2009 | Buck et al. .................... 429/120 |
| 8,182,936 B2 * | 5/2012 | Tamura et al. ................. 429/72 |
| 2003/0059677 A1 * | 3/2003 | Shinohara et al. ............ 429/174 |
| 2003/0124419 A1 | 7/2003 | Ito et al. |
| 2006/0210868 A1 | 9/2006 | Kim et al. |
| 2006/0216582 A1 | 9/2006 | Lee et al. |
| 2008/0247135 A1 * | 10/2008 | Inoue et al. .................. 361/695 |
| 2008/0305388 A1 * | 12/2008 | Haussman .................... 429/120 |

FOREIGN PATENT DOCUMENTS

| | | |
|---|---|---|
| JP | 2003-346759 | 12/2003 |
| JP | 2005-71674 | 3/2005 |
| JP | 2006-269426 | 10/2006 |
| JP | 2006-278327 | 10/2006 |
| JP | 2007-227030 | 9/2007 |
| JP | 2008-257960 | 10/2008 |

* cited by examiner

FIG. 3
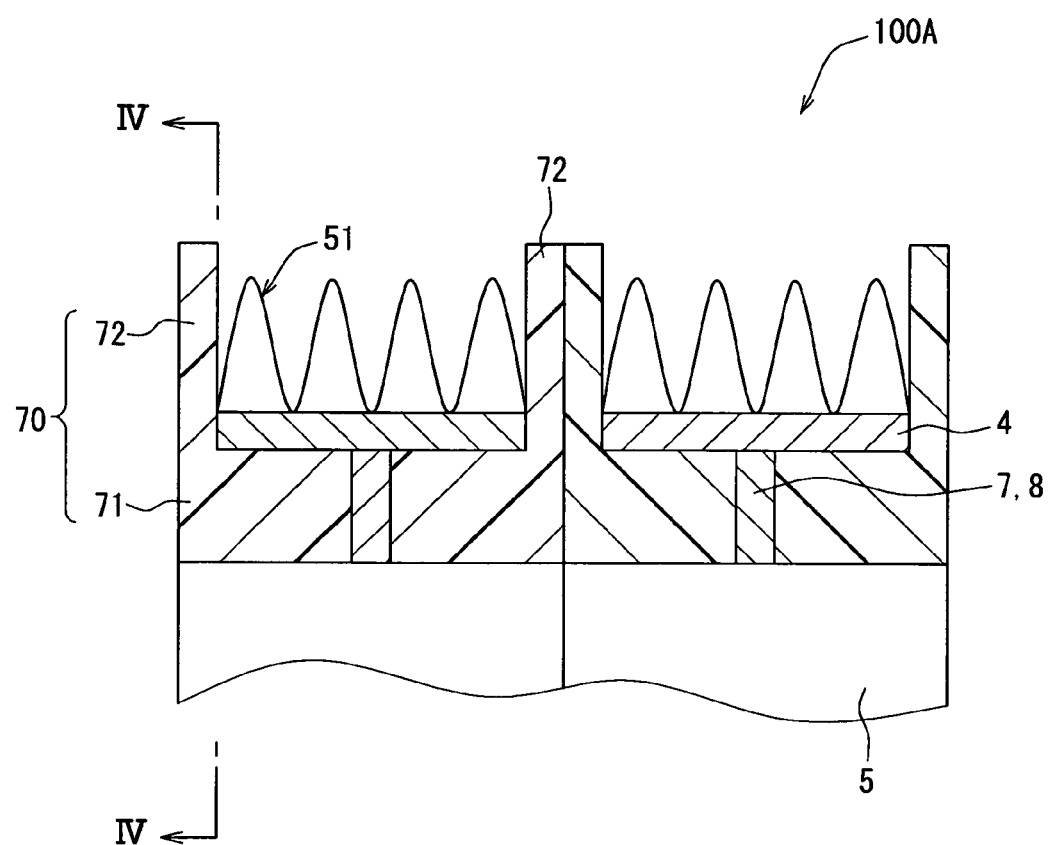
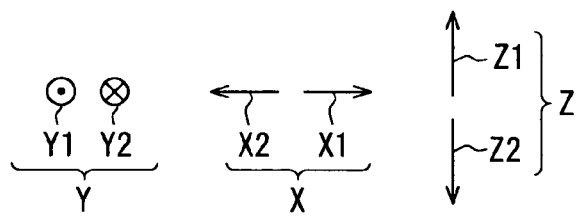

FIG. 5
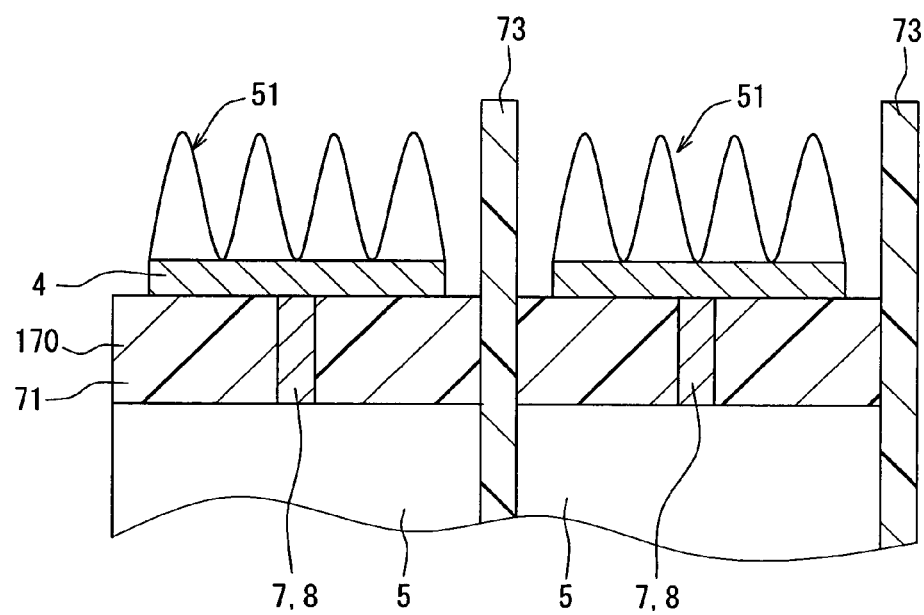
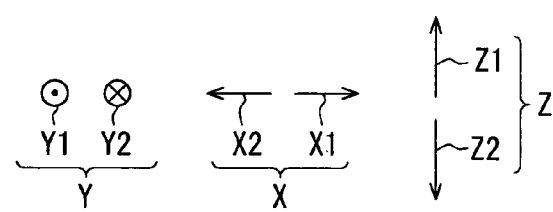

BATTERY UNIT WITH BLOWER

CROSS REFERENCE TO RELATED APPLICATION

This application is based on Japanese Patent Application No. 2008-96468 filed on Apr. 2, 2008, the disclosure of which is incorporated herein by reference.

FIELD OF THE INVENTION

The present invention relates to a battery unit with a blower, which is, for example, used as a driving power source of a vehicle driving motor.

BACKGROUND OF THE INVENTION

A battery unit is, for example, described in JP-A-2003-346759. The described battery unit includes a battery module assembly as a battery, which is an important part, and a blower for cooling the battery module assembly. The battery module assembly is housed in a battery cover. The blower has a blower casing. The blower casing is connected to the battery cover at a position above the battery module assembly, and a passage of the air is defined therein.

Such a battery unit is, for example, mounted in hybrid vehicles. Thus, silence is required in an eco-running mode in which an engine is stopped. Also, in a case where the battery unit is arranged on a rear side of a luggage room of the hybrid vehicle, it is generally required to be compact.

In the described battery unit, the battery module assembly is inclined downward toward the blower relative to a flow direction of the air blown from the blower. Because a predetermined passage is defined between an upper inner surface of the battery cover and an upper surface of the battery module assembly, resistance to flow of the air is reduced, and hence noise is reduced. On the other hand, a size of the battery unit including the battery cover and the blower casing increases due to the passage being provided by the arrangement of the battery module assembly.

SUMMARY OF THE INVENTION

It is an object of the present invention to provide a battery unit with a blower, which is capable of reducing noise and size. It is another object of the present invention to provide a battery unit with a blower, which is capable of reducing unevenness of temperature between battery modules. It is further another object of the present invention to provide a battery unit with a blower, which is capable of accommodating members, such as wires and the like, with a compact structure. It is yet another object of the present invention to provide a battery unit with a blower, which is capable of restricting unexpected short circuits between battery modules with a simple structure. It is still another object of the present invention to provide a battery unit with a blower, which is capable of efficiently cooling battery modules. It is still another object of the present invention to provide a battery unit with a blower, which is capable of efficiently heating battery modules with a simple structure.

According to an aspect of the present invention, a battery unit includes a battery housing, a module assembly disposed in the battery housing, electrode portions, a blower, and fins. The module assembly includes a plurality of battery modules being stacked and having positive terminals and negative terminals. The module assembly defines a first surface extending along a stacking direction in which the battery modules are stacked and a second surface opposite to the first surface and extending along the stacking direction. The electrode portions are disposed along the module assembly and electrically connecting the positive terminals and the negative terminals of the battery modules. The blower is disposed to oppose a side wall of the battery housing, the side wall extending along the stacking direction without facing the first surface and the second surface of the module assembly. The blower is in communication with the battery housing for supplying air into the battery. The blower has a rotation shaft that is located between a first plane and a second plane, the first plane including the first surface of the module assembly, the second plane including the second surface of the module assembly. The fins are disposed along the electrode portions. The blower is configured such that air is supplied toward the fins over a range substantially equal to a dimension of the module assembly with respect to the stacking direction. The fins have surface areas that increase toward a downstream location with respect to a flow of the air.

In the above construction, since the rotation shaft of the blower is disposed between the first plane and the second plane of the module assembly, an entire size of the battery unit in a direction perpendicular to the first and second planes, such as a height, is reduced. Further, the air is supplied toward the first surface of the module assembly over a substantially entire range of the module assembly with respect to the stacking direction. Therefore, the air is supplied substantially equally to the battery modules with respect to the stacking direction while reducing a resistance to flow of the air. Accordingly, noise is reduced while reducing the size of the battery unit.

Further, since the fins are disposed along the electrode portions, the heat transfer area, such as a heat radiation area for radiating heat from the battery modules, is increased. Moreover, the fins have surface areas that increase in accordance with the flow direction of the air. That is, a first fin, which is located downstream of a second fin with respect to the flow of air, has a surface area greater than a surface area of the second fin. Therefore, the amount of heat transfer is substantially equal between the fins. As such, unevenness of heat transfer capability is reduced with respect to a flow direction of the air. Accordingly, unevenness of temperature between the battery modules is reduced, and hence a stable performance of the battery unit is achieved.

According to a second aspect of the present invention, a battery unit includes a battery housing, a module assembly, electrode portions, a blower, and an accommodation member. The module assembly is disposed in the battery housing. The module assembly includes a plurality of battery modules being stacked and having positive terminals and negative terminals. The module assembly defines a first surface extending along a stacking direction in which the battery modules are stacked and a second surface opposite to the first surface and extending along the stacking direction. The first surface of the module assembly is spaced from an inner surface of the battery housing to provide a passage space between the module assembly and the inner surface of the battery housing. The electrode portions are disposed along the module assembly and electrically connect the positive terminals and the negative terminals of the battery modules. The blower is disposed to oppose a side wall of the battery housing, the side wall extending along the stacking direction without facing the first surface and the second surface of the module assembly. The blower is in communication with the battery housing for supplying air toward the passage space of the battery housing over a range substantially equal to a dimension of the module assembly with respect to the stacking direction. The blower has a rotation shaft that is located between a first plane and a second plane, the first plane including the first surface of the module assembly, the second plane including the second surface of the module assembly. The accommodation member is disposed along the first surface of the module assembly to cover at least a portion of the first surface other than the electrode portions. The accommodation member extends over the stacking direction, and has an opposed wall opposed to the first surface of the module assembly across a clearance to provide an accommodation space between the first surface of the module assembly and the opposed wall. The opposed wall is spaced from the inner surface of the battery housing to provide the passage space for allowing the air to flow.

In the above configuration, the accommodation space provided by the accommodation member can be used for leading wires. The wires are, for example, sensor cables for detecting conditions of the battery modules, such as temperature and the like. Since the opposed wall of the accommodation member is spaced from the inner surface of the battery housing, it is less likely that the air passing through the passage space will be affected by the accommodation member.

According to a third aspect of the present invention, a battery unit includes a battery housing, a module assembly, electrode portions, a blower, and an insulative member. The module assembly is disposed in the battery housing, the module assembly including a plurality of battery modules being stacked and having positive terminals and negative terminals. The module assembly defines a first surface extending along a stacking direction in which the battery modules are stacked and a second surface opposite to the first surface and extending along the stacking direction. The electrode portions are disposed to electrically connect the positive terminals and the negative terminals of the battery modules. The blower is disposed to oppose a side wall of the battery housing, the side wall extending along the stacking direction without facing the first surface and the second surface of the module assembly. The blower is in communication with the battery housing for supplying air into the battery housing over a range substantially equal to a dimension of the module assembly with respect to the stacking direction. The blower has a rotation shaft that is located between a first plane and a second plane, the first plane including the first surface of the module assembly, the second plane including the second surface of the module assembly. The insulative member is disposed between the first surface of the module assembly and the electrode portions.

In this configuration, since the insulative member is disposed between the first surface of the module assembly and the electrode portions, it is less likely that foreign materials, such as dust, droplets and the like, will enter between the first surface of the module assembly and the electrode portions. Accordingly, unexpected short circuits between the adjacent battery modules caused by the entry of the foreign materials are reduced.

According to a fourth aspect of the present invention, a battery unit includes a battery housing, a module assembly, electrode portions, fins, and a blower. The module assembly is disposed in the battery housing. The module assembly includes a plurality of battery modules having positive terminals and negative terminals and being stacked with predetermined clearances therebetween. The module assembly defines a first surface extending along a stacking direction in which the battery modules are stacked and a second surface opposite to the first surface and extending along the stacking direction. The electrode portions are disposed along the module assembly and electrically connect the positive terminals and the negative terminals of the battery modules. The fins are disposed along the electrode portions. The blower is disposed to oppose a side wall of the battery housing, the side wall extending along the stacking direction without facing the first surface and the second surface of the module assembly. The blower is in communication with the battery housing for supplying air into the battery housing over a range substantially equal to a dimension of the module assembly with respect to the stacking direction. The blower has a rotation shaft that is located between a first plane and a second plane, the first plane including the first surface of the module assembly, the second plane including the second surface of the module assembly. The module assembly and the blower are configured such that a first air path and a second air path are provided in the battery housing, the first air path passing through the fins, the second air path passing through the predetermined clearances defined between the battery modules.

In the above configuration, the air generated by the blower flows through the fins and the clearances between the adjacent battery modules. That is, since the air flows along outer surfaces of the adjacent battery modules, a cooling performance of the battery modules improves.

According to a fifth aspect of the present invention, a battery unit includes a battery housing, a module assembly, electrode portions, fins, a blower and a heating member. The module assembly is disposed in the battery housing. The module assembly includes a plurality of battery modules being stacked and having positive terminals and negative terminals. The module assembly defines a first surface extending along a stacking direction in which the battery modules are stacked and a second surface opposite to the first surface and extending along the stacking direction. The electrode portions are disposed along the module assembly and electrically connect the positive terminals and the negative terminals of the battery modules. The fins are disposed along the electrode portions. The blower is disposed to oppose a side wall of the battery housing, the side wall extending along the stacking direction without facing the first surface and the second surface of the module assembly. The blower is in communication with the battery housing for supplying air toward the fins over a range substantially equal to a dimension of the module assembly with respect to the stacking direction. The blower has a rotation shaft that is located between a first plane and a second plane, the first plane including the first surface of the module assembly, the second plane including the second surface of the module assembly. The heating member disposed to heat air generated by the blower.

In the above configuration, the air generated by the blower can be heated by the heating member. When the temperature of the battery modules is lower than a predetermined temperature, heated air is applied to the fins and hence the battery modules can be heated. Accordingly, a battery performance is stably exhibited.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 3 is a cross-sectional view of a part of a battery unit for showing an example of an insulative covering member according to a second embodiment of the present invention;

FIG. 5 is a cross-sectional view of a part of a battery unit for showing another example of the insulative covering member according to the second embodiment.

DETAILED DESCRIPTION OF EXEMPLARY EMBODIMENTS

First Embodiment

A first embodiment of the present invention will now be described with reference to FIGS. 1 and 2. A battery unit 100 of the present embodiment is, for example, used in a hybrid vehicle driven by an internal combustion engine and a battery-driven motor. The battery unit 100 includes a battery as a driving source of a driving motor and a blower for generating air, such as cooling air, toward the battery. The battery is, for example, a nickel-metal hydride secondary battery, a lithium-ion secondary battery, an organic radical battery or the like. The battery unit 100 is mounted in a predetermined place of a vehicle, such as under a seat, in a space defined between a rear seat and a luggage room, in a space defined between a driver's seat and a front passenger's seat, or the like.

Figure 1:
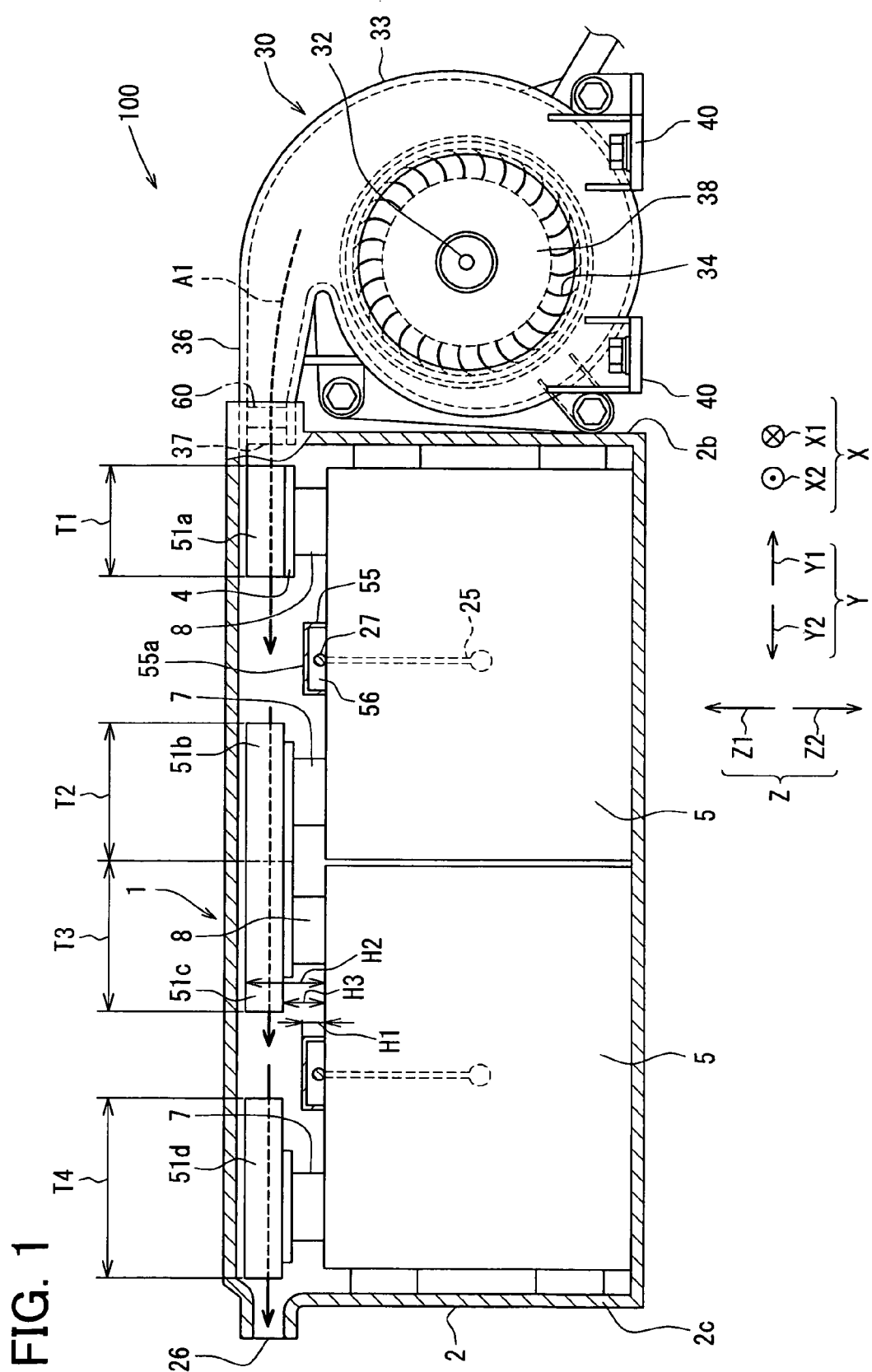
FIG. 1 is a schematic side view of a battery unit, partly including a cross-section, according to a first embodiment of the present invention.
Figure 2:
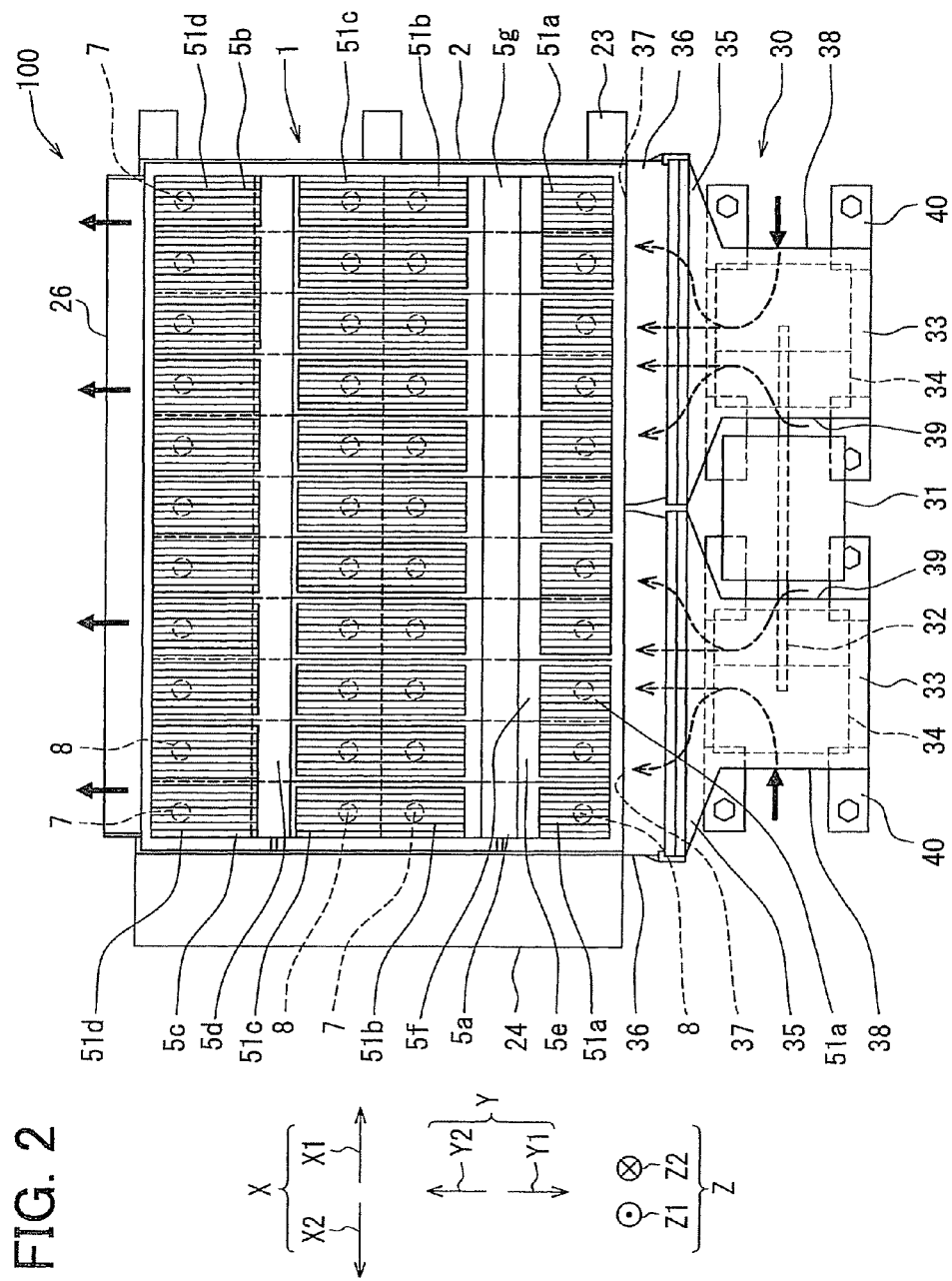
FIG. 2 is a schematic top view of the battery unit according to the first embodiment.

Referring to FIGS. 1 and 2, the battery unit 100 generally includes a module assembly 1 as the battery and a blower 30 for generating air for mainly cooling the module assembly 1. The module assembly 1 and the blower 30 are integrated into a battery package and mounted in the predetermined place of the vehicle. In the drawings, a dashed arrow A1 denotes a general flow of the air generated by the blower 30.

The module assembly 1 is constructed of multiple battery modules 5. The battery modules 5 are electrically connected in series, and housed in a battery housing 2. Further, in the battery housing 2, the battery modules 5 are arranged parallel with each other in a first direction X such that side surfaces thereof are opposed to each other, the side surfaces extending in a longitudinal direction Y of the battery modules 5. Each of the battery modules 5 extend in a second direction Y, which is substantially parallel to a flow direction of the air blown by the blower 30.

Hereinafter, the first direction X is also referred to as a stacking direction of the battery modules 5 as well as a width direction of the module assembly 1. The second direction Y is also referred to as a longitudinal direction of the battery module 5. The width direction X corresponds to a direction perpendicular to a paper surface of FIG. 1 and a right and left direction in FIG. 2. The longitudinal direction Y of the battery module 5 is perpendicular to the width direction X. Hereinafter, structures of the battery unit 100 will be exemplarily described in a case where the battery unit 100 is arranged such that a third direction Z, which is perpendicular to the first direction X and the second direction Y, corresponds to an up and down direction. Thus, the third direction X is also referred to as the up and down direction. However, an arrangement direction of the battery unit 100 in the vehicle is not limited to such a direction.

The battery housing 2 has a generally rectangular parallelepiped box shape, and at least one side wall of the battery housing 2 is detachable, such as for a purpose of maintenance. The battery housing 2 is made of a resin, steel sheet, or the like. The battery housing 2 includes a device box 24 and fixing portions 23 on its sides with respect to the width direction X, as shown in FIG. 2. The battery housing 2 is fixed to a part of the vehicle by fastening fixing parts such as bolts through the fixing portions 23.

The device box 24 houses various devices, such as a battery monitoring unit (not shown) in association with sensors 25 for monitoring conditions of the battery modules 5, a control unit (not shown) for controlling a motor 31 of the blower 30 and the battery modules 5, wire harnesses (not shown) for wiring various devices, and the like.

Each of the battery modules 5 is covered with an electrical insulative resinous outer case. The battery module 5 has a generally flat rectangular parallelepiped shape. The battery module 5 has a positive terminal 8 and a negative terminal 7 at ends. The positive terminal 8 and the negative terminal 7 are separated from each other in the longitudinal direction Y of the battery module 5. The positive terminal 8 and the negative terminal 7 are exposed from the outer case. The longitudinal direction Y is substantially parallel to the flow direction of the air generated by the blower 30.

In the battery housing 2, the module assembly 1 is disposed such that a first space is defined between the first inner surface of the battery housing 2 and a first surface of the module assembly 1. For example, the first space is defined between an upper inner surface of the battery housing 2 and an upper surface of the module assembly 1. Also, the module assembly 1 is disposed such that a second surface thereof (e.g., bottom surface in FIG. 1) is separated from a second inner surface (e.g., an inner bottom surface in FIG. 1) of the battery housing 2 for defining a second space. In this case, a dimension of the second space is sufficiently smaller than a dimension of the first space, with respect to the up and down direction X. Alternatively, the module assembly 1 can be disposed such that the second surface thereof is in contact with the second inner surface of the battery housing 2.

The dimension of the first space is relatively large in the up and down direction in FIG. 1 for housing electrode portions 4 and wire units 55 including wires 27 therein and for allowing the air generated by the blower 30 to pass through for mainly cooling the module assembly 1. Therefore, the first space can be also referred to as a passage space.

The battery modules 5 are arranged in two rows, such as an upstream row and a downstream row, with respect to the flow direction of the air (e.g., the up and down direction in FIG. 2). The battery modules 5 of the upstream row are spaced from the battery modules 5 of the downstream row by a predetermined distance. In each of the upstream row and the downstream row, the battery modules 5 are stacked close to each other in the width direction X. Further, the battery modules 5 are arranged to occupy an entire inner space of the battery housing 2 in the width direction X. In other words, the battery modules 5 are arranged substantially over the width of the battery housing 2. In the embodiment shown in FIG. 2, for example, each row has eleven battery modules 5.

All the battery modules 5 in the battery housing 2 are electrically connected through the electrode portions 4 as conductive members. Further, all the battery modules 5 are electrically connected in series from the positive terminal 8 of a first battery module 5a that is located at an end of the upstream row (e.g., left end in FIG. 2) to the negative terminal 7 of a second battery module 5b that is located at an opposite end of the downstream row (e.g., right end in FIG. 2) in a meandering manner. Hereinafter, some of battery modules 5 are designated with reference numerals 5a to 5g for convenience of explanation.

The first battery module 5a has the positive terminal 8 at a first end (e.g., a lower end in FIG. 2) in a first longitudinal direction Y1. The electrode portion 4 that is electrically connected to the positive terminal 8 of the first battery module 5a corresponds to a positive electrode portion of the module assembly 1. The negative terminal 7 of the second battery module 5b corresponds to a negative electrode portion of the module assembly 1.

The first battery module 5a is electrically connected to a third battery module 5c, which is located next to the first battery module 5a in a second longitudinal direction Y2. Specifically, the negative terminal 7 disposed at a second end (e.g., an upper end in FIG. 2) of the first battery module 5a is electrically connected to the positive terminal 8 of the third battery module 5c, which is located at a first end (e.g., a lower end in FIG. 2) of the third battery module 5c, through the electrode portion 4 extending in the longitudinal direction Y.

The third battery module 5c is electrically connected to a fourth battery module 5d, which is located next to the third battery module 5 in a first width direction X1. Specifically, the third battery module 5c has the negative terminal 7 at a second end (e.g., an upper end in FIG. 2), and the fourth battery module 5d has the positive terminal 8 at a second end (e.g., an upper end in FIG. 2). The negative terminal 7 of the third battery module 5c is electrically connected to the positive electrode 8 of the fourth battery module 5d through the electrode portion 4 extending in the width direction X.

The fourth battery module 5d is electrically connected to a fifth battery module 5e, which is located next to the fourth battery module 5d in the first longitudinal direction Y1. The fourth battery module 5d has the negative terminal 7 at a first end (e.g., a lower end in FIG. 2), and the fifth battery module 5e has the positive terminal 8 at a second end (e.g., an upper end in FIG. 2). The negative terminal 7 of the fourth battery module 5d and the positive terminal 8 of the fifth battery module 5e are electrically connected through the electrode portion 4 extending in the longitudinal direction Y.

The fifth battery module 5e is electrically connected to a sixth battery module 5f, which is located next to the fifth battery module 5e in the first width direction X1. The fifth battery module 5e has the negative terminal 7 at a first end (e.g., a lower end in FIG. 2), and the sixth battery module 5f has the positive terminal 8 at a first end (e.g., a lower end in FIG. 2). The negative terminal 7 of the fifth battery module 5e is electrically connected to the positive terminal 8 through the electrode portion 4 extending in the width direction X.

Likewise, opposite electrode terminals, such as the positive terminal 8 and the negative terminal 7, of the battery modules 5, which are next to each other, are electrically connected in series through the electrode portions 4 connecting therebetween up to the second battery module 5b while meandering in the width direction X. The positive terminal 8 of the second battery module 5b is electrically connected to the negative terminal 7 of a seventh battery module 5g, which is located next to the second battery module 5b in the first longitudinal direction Y1, through the electrode portion 4, and is further electrically connected to the electrode portion 4 at the second end of the seventh battery module 5g through the seventh battery module 5g.

Accordingly, all the battery modules 5 housed inside of the battery housing 2 are electrically connected through the electrode portions 4 in series from the electrode portion 4 of the first end of the first battery module 5a to the electrode portion 4 of the second end of the second battery module 5b in a zigzag manner or meandering manner.

Fins 51, such as fins 51a, 51b, 51c, 51d, are disposed above the electrode portions 4 for transferring heat to or from the battery modules 5. Here, reference numeral 51a denotes an upstream most fin, which is located at an upstream most location with respect to the flow of the air, and reference numeral 51d denotes a downstream most fin, which is located at a downstream most location with respect to the flow of the air. Reference numerals 51b and 51c denote a middle upstream fin and a middle downstream fin, which are located between the upstream most fin 51a and the downstream most fin 51d.

The fins 51 are correspondingly disposed above the positive terminals 8 and the negative terminals 7 in the direction Z1. The fins 51 are made of a metal, such as aluminum alloy, and have a corrugate shape. The fins 51 are disposed such that creases are arranged in the width direction X and extend in the longitudinal direction Y such that the air blown by the blower 30 generally flows through valleys of the corrugate shape in the longitudinal direction Y.

The fins 51 are configured such that surface areas thereof increase with respect to the flow direction of the air. In other words, the first fin 51 that is located downstream of the second fin 51 has a surface area greater than that of the second fin 51.

For example, the first fin 51 has the amount of heat radiation substantially equal to that of the second fin 51. Here, the expression "substantially equal" also includes the meaning of "equal". In other words, a first fin 51 that is located next to a second fin 51 in the second longitudinal direction Y2 has the amount of heat radiation substantially equal to that of the second fin 51. The amount of heat radiation of each fin 51 is in proportion to the product of a temperature differential between the fin 51 and the air and the surface area of the fin 51. The temperature of the air increases toward the downstream location due to heat exchange with the fins 51. The fins 5 are configured such that the amount of heat radiation is substantially equal between them even if the temperature of the air is increased toward the downstream location. In other words, the upstream most fin 51a has the smallest amount of heat radiation, and the amount of heat radiation increases toward the downstream most fin 51d with respect to the air having the same temperature.

The battery modules 5 are disposed in two rows, and the predetermined clearance is provided between the upstream row and the downstream row. That is, two battery modules 5 are disposed in the longitudinal direction Y in each line, and hence four terminals 7, 8 are arrayed in the longitudinal direction Y in each line. Therefore, the fins 51 are arranged in four rows. In the embodiment shown in FIGS. 1 and 2, the middle upstream fins 51b, which is in a second row and the middle downstream fins 51c, which is in a third row, are integrated with each other. However, the terminals 7, 8 of the first row of the battery modules 5 and the terminals 7, 8 of the second row of the battery modules 5 are separate. Therefore, the middle upstream fins 51b and the middle downstream fins 51c are treated as separate fins, for convenience of explanation.

As an example, the dimension (length) of the fins 51 in the longitudinal direction Y gradually increases toward the downstream location such that the surface areas of the fins 51 increase toward the downstream location, that is, with respect to the second longitudinal direction Y2. That is, a dimension T1 of the upstream most fin 51a, a dimension T2 of the middle upstream fin 51b, a dimension T3 of the middle downstream fin 51c, and a dimension T4 of the downstream most fin 51d satisfy a relationship of T1<T2<T3<T4.

Wire units 55 are disposed above the module assembly 1. Each of the wire unit 55 constitutes a space-forming member or an accommodation member extending along the module assembly 1 over the width direction X and covering at least a part of an upper portion of each battery module 5 other than the electrode portions 4. The wire unit 55 provides a space 56, such as an accommodation space, that continuously extends in the width direction X therein.

The wires 27 that electrically connect the sensors 25 for monitoring battery conditions, such as temperature sensors, to the device box 24 are disposed in the space 56. The sensors 25 are correspondingly provided with the wires 27. Each of the wires 27 extends out from the upper surface of the battery module 5. That is, the wire units 55 are provided for leading the wires 27, which extend out from the battery modules 5, to the device box 24 that is provided on the side of the module assembly 1 in the second width direction X2.

Each wire unit 55 has a substantially U-shape in a cross-section defined along the up and down direction Z and the longitudinal direction Y, and is open in the downward direction Z2, as shown in FIG. 1. Thus, the space 56 is provided by the U-shaped wire unit 55 and the upper surfaces of the battery modules 5. The space 56 is separated from the passage space through which the air flows.

The wire unit 55 has an opposed wall 55a, such as an upper wall, extending along the longitudinal direction Y and the width direction X. The upper wall 55a of the wire unit 55 is spaced from the upper inner surface of the battery housing 2 by a predetermined distance such that a space for allowing the air to flow is provided between the upper wall 55a of the wire unit 55 and the upper inner surface of the battery housing 2.

A dimension H1 of the wire unit 55 from the upper surface of the battery modules 5 in the upward direction Z1, that is, a height of the wire unit 55 in the up and down direction Z, is smaller than a distance H2 between the upper surface of the battery modules 5 and a top end of the fin 51 disposed above the electrode portion 4. For example, the dimension H1 of the wire unit 55 is smaller than a distance H3 between the upper surface of the battery modules 5 and a top surface of the electrode portion 4 in the up and down direction Z.

The dimension H1 of the wire unit 55 can be determined such that the wire unit 55 is not disposed in the passage space of the battery housing 2. Specifically, the dimension H1 of the wire unit 55 is determined such that the wire unit 55 is not encompassed in a projected area of outlet ports 37 of the blower 30 when the outlet ports 37 are projected in the longitudinal direction Y.

The blower 30 is integrated with the battery housing 2. For example, the blower 30 is located to face a side wall 2b of the battery housing 2, the side wall 2b being other than upper and lower walls of the battery housing 2 and being perpendicular to side walls that are parallel to the longitudinal direction Y of the battery modules 50. In other words, the blower 30 is integrated with the battery housing 2 in a condition of being opposed to the side wall 2b of the battery housing 2, the side wall 2b being located at an end of the housing 2 in the first longitudinal direction Y1 and extending along the width direction X.

The blower 30 is provided to generate air, such as cooling air, toward the fins 51. The blower 30 generally includes two fans 34, a single motor 31 for driving the fans 34, and two casings 33. The fans 34 are correspondingly accommodated in the casings 33.

The fans 34 are, for example, centrifugal fans having resistance to high static pressure and generating low noise with low-air volume. In the present embodiment, the fans 34 are sirocco fans having forward blades, for example. Alternatively, the fans 34 can be radial fans having radial blades.

The motor 31 is arranged such that a rotation shaft 32 extends in the width direction X, such as in a substantially horizontal direction. The fans 34 are fixed to opposite ends of the rotation shaft 32. As shown in FIG. 1, the rotation shaft 32 is arranged such that its axis is located between an upper end of the module assembly 1 and a lower end of the module assembly 1 with respect to the up and down direction Z. That is, the position of the rotation shaft 32 is higher than the lower end of the module assembly 1 and lower than the upper end of the module assembly 1, with respect to the up and down direction Z. In other words, the rotation shaft 32 is located between a first plane (i.e., first imaginary plane) that includes the first surface (e.g., the upper surface) of the module assembly 1 and a second plane (i.e., second imaginary plane) that includes the second surface (e.g., the lower surface) of the module assembly 1.

For example, a diameter of each fan 34 is equal to or smaller than a dimension (height) of the module assembly 1 in the up and down direction Z. Further, the fan 34 is arranged such that an upper end and a lower end thereof are located between the upper end and the lower end of the module assembly 1 with respect to the up and down direction Z. Moreover, the casing 33 is arranged such that an upper end and a lower end thereof are located between an upper end and a lower end of the battery housing 2 with respect to the up and down direction Z.

In a case where the casing 33 is arranged such that the lower end thereof is located higher than the lower end of the battery housing 2 with respect to the up and down direction Z, the device box 24 can be arranged in a space defined under the lower end of the casing 33. In this case, the size of the battery unit 100 including the device box 24 can be reduced.

An operation of the motor 31 is controlled by the control unit (not shown). For example, the control unit conducts a RWM control in which a voltage is modulated by varying a duty ratio of pulse waves. By the RWM control of the control unit, a rotational speed of the fan 34 is variably controlled in accordance with a target cooling capacity. Accordingly, a surface temperature of the module assembly 1, which is for example detected by a temperature sensor and the like, is controlled.

Each of the casings 33 has a scroll shape and accommodates the fan 34 therein. The casing 33 has suction openings 38, 39 on opposite sides with respect to an axial direction of the rotation shaft 32 for suctioning air therein. That is, the suction openings 38, 39 open in the axial direction. The casing 33 forms an air passage between its inner surface and the blades of the fan 34. A passage area (e.g., cross-sectional area) of the air passage gradually increases toward a downstream position with respect to a flow of air generated by the fan 34. The casing 33 is integrally formed with fixing leg portions 40. The fixing leg portions 40 are fixed to portions of the vehicle through fixing devices such as bolts, and thus the casing 33 is fixed to the vehicle.

The casing 33 has the outlet port 37 for blowing the air toward the upper surface of the module assembly 1. The outlet port 37 faces the passage space provided above the module assembly 1 within the battery housing 2 and is located on the substantially same level as the fins 51 with respect to the up and down direction Z. As shown in FIG. 2, the casing 33 includes an expanding portion 35 and a tubular portion 36. The expanding portion 35 is configured such that a dimension thereof in the axial direction of the rotation shaft 32 increases toward the outlet port 37.

The tubular portion 36 extends from the expanding portion 35 to the outlet port 37 with a constant width. The outlet port 37 is open at a location higher than the fan 34 with respect to the up and down direction Z and closer to the module assembly 1 than the fan 34. The casing 33 is configured to protrude toward the module assembly 1 and the sides of the fan 34 from the location above the fan 34 through the expanding portion 35, and the air passage of the casing 33 connects to the outlet port 37 through the tubular portion 36.

The casing 33 forms a scroll passage in an area directly facing the fan 34, and the expanding portion 35 extends from a downstream position of the scroll passage. The scroll passage has a passage area (e.g., cross-sectional area) that gradually increases toward the downstream position. The dimension of the expanding portion 35 in the width direction X increases to correspond to the width of the outlet port 37, which is flat in the width direction X.

The expanding portion 35 is located above the fan 34. The dimension of the expanding portion 35 in the up and down direction Z, such as in a radial direction of the fan 34, gradually reduces toward the outlet port 37. The passage area (cross-sectional area) of the expanding portion 35 gradually increases toward the outlet port 37. The expanding portion 35 is configured such that the passage area thereof gradually varies toward the flat outlet port 37, which corresponds to the passage space provided above the module assembly 1 in the battery housing 2.

The tubular portion 36 has the outlet port 37 at it downstream end. The tubular portion 36 is connected to a connection port of the battery housing 2 such that the outlet port 37 faces the passage space provided above the battery module 1 in the battery housing 2. The outlet port 37 has a flat rectangular shape in which a dimension in the up and down direction Z is smaller than a dimension in the width direction X.

In the present embodiment, for example, two casings 33 are aligned in the width direction X. Thus, two outlet ports 37 are aligned in the width direction X. A total width of the outlet ports 37 in the width direction X is substantially equal to the width of the module assembly 1.

Since the casings 33 have the expanding portions 35 providing the air passages whose cross-sectional area increases toward the outlet port 37, the air can flow toward the outlet ports 37 while expanding evenly in the width direction X. That is, the air can be conducted to the passage space of the battery housing 2 evenly in the width direction X. Also, the dimension of the casing 33 in the longitudinal direction Y, that is, in an air blowing direction can be reduced.

The battery housing 2 has a discharge port 26 for discharging the air, which has passed through the fins 1. The discharge port 26 is disposed on a side wall 2c that is opposed to the side wall 2b to which the tubular portion 36 of the blower 30 is connected in the longitudinal direction Y. The side wall 2c extends along the width direction X. Also, the discharge port 26 is located at an upper portion of the side wall 2c. That is, the discharge port 26 is opposed to the outlet ports 37 with respect to the longitudinal direction Y. For example, the discharge port 26 is located on the substantially same level as the outlet ports 37 and the fins 51 with respect to the up and down direction Z.

The battery unit 100 further includes a heating member 60 for heating the air generated by the blower 30. In FIG. 1, an image of an example of the heating member 60 is illustrated for easing understanding thereof. In FIG. 2, the illustration of the heating member 60 is omitted.

The heating member 60 is disposed between the upstream most fin 51a and the outlet port 37 of the blower 30. For example, the heating member 60 is integrated with the outlet port 37 of the blower 30. The heating member 60 is configured so as to reduce resistance to flow of the air. As an example, the heating member 60 is an electric-type heat-generating member. For example, the heating member 60 is constructed of a high-electrical resistance wire, such as a nichrome wire. When being electrically conducted, the heating member 60 generates heat due to electrical resistance, thereby to heat the air blown by the fan 34. An operation of the heating member 60 is controlled, for example, by the control unit that controls the motor 31.

Next, the flow of the air from the outlet port 37 will be described. The air is blown out from the outlet port 37 toward the upper surface of the module assembly 1 at relatively high velocity and under high static pressure, though the flow rate thereof is relatively low. Since the casing 30 has the expanding portion 35 and the outlet port 37 having the above discussed configuration, the air is generated in the compact casing 33 and is blown into the passage space, which is a relatively limited space, in the battery housing 2 while reducing noise.

The air suctioned from the suction openings 38, 39 is blown out from the outlet port 37 through the scroll passage and the passage provided in the expanding portion 35. The outlet port 37 is located at the upper portion of the battery housing 2. Also, the total dimension of the outlet ports 37 in the width direction X is substantially equal to the width of the module assembly 1. That is, the outlet ports 37 are widely open ever the width direction X. Therefore, the air is conducted substantially entirely over the upper portion in the battery housing 2.

In a condition where the heating member 60 is not in operation, the air is blown out from the outlet port 37 toward the upper surface of the module assembly 1 without being heated by the heating member 60. The air reaches the upper surfaces of the battery modules 5 in the upstream row and the battery modules 5 in the downstream row, and hence cools the upper portion of the module assembly 1.

Specifically, the air flows toward the fins 51 disposed above the module assembly 1. The air flows through the upstream most fin 51a, the middle upstream fin 51b, the middle downstream fin 51c and the downstream most fin 51 51d. While passing through the fins 51a, 51b, 51c, 51d, the air absorbs heat from the fin surfaces, thereby to cool the fins 51a, 51b, 51c, 51d. As such, the module assembly 1 is cooled. Thereafter, the air reaches the discharge port 26 and flows out from the battery housing 2.

In a condition where the heating member 60 is in operation, the air generated by the fan 34 is heated by the heating member 60. The air is blown toward the upper surface of the module assembly 1 from the outlet port 37. The air reaches the upper surfaces of the battery modules 5 in the upstream row and the upper surfaces of the battery modules 5 in the downstream row, and heats the upper portion of the module assembly 1.

Specifically, the air blown out from the outlet port 37 flows toward the fins 51 disposed above the module assembly 1. The air flows through the upstream most fin 51a, the middle upstream fin 51b, the middle downstream fin 51c and the downstream most fin 51d. While passing through the fins 51a, 51b, 51c, 51d, the air releases heat to the fin surfaces. Thus, the fins 51a, 51b, 51c, 51d are heated and hence the module assembly 1 is heated. Thereafter, the air reaches the discharge port 26 and flows out from the battery housing 2.

As discussed above, the blower 30 is aligned to the module assembly 1 in the longitudinal direction Y. The rotation shaft 32 of the blower 30 is arranged parallel to the width direction X and is located between the upper end and the lower end of the module assembly 1 with respect to the up and down direction Z. The blower 30 is configured such that the air is blown widely over the width of the module assembly 1.

In such a case, since the rotation shaft 32 is not located higher than the upper end of the module assembly 1 nor lower than the lower end of the module assemble 1 with respect to the up and down direction Z, the size of the battery unit 100 including the module assembly 1 and the blower 30 is reduced with respect to the up and down direction Z. Further, the outlet ports 37 of the blower 30 are located at the upper portion of the battery housing 2 and the air is blown from the outlet ports 37 toward the upper surface of the module assembly 1. Moreover, the air is blown widely over the width of the module assembly 1. Accordingly, the air is blown at the relatively low flow rate. Therefore, a cooling performance of the battery unit 100 improves while reducing noise.

The casing 33 of the blower 30 has the suction openings 38, 39, the expanding portion 35 and the outlet port 37. The air is suctioned from the suction openings 38, 39 and is blown out from the outlet port 37 through the expanding portion 35 with the rotation of the fan 34. The outlet port 37 is disposed to open to the upper portion of the battery housing 2. The outlet port 37 is the flat opening in which the dimension in the up and down direction Z is smaller than the dimension in the width direction X.

When such a configuration is employed, the air is blown toward the module assembly 1 with the substantially equal velocity distribution by the expanding portion 35. Further, in the case where the fan 34 is the centrifugal fan, such as the sirocco fan, the air is supplied at the relatively low flow rate and under high static pressure. Therefore, the air can be introduced into the passage space of the battery housing 2 in which resistance to flow in the passage space is relatively high due to the battery unit 100 being reduced in size, while reducing noise. As such, the cooling operation of the battery unit 100 is performed with saved energy while reducing noise. Further, since the outlet port 37 is the flat opening having the small dimension in the up and down direction Z, the air can be supplied at high velocity though at the low flow rate. Therefore, the cooling performance of the battery unit 100 is sufficiently ensured while reducing the noise.

In the case where the fins 51 are disposed above the module assembly 1, the heat radiation area increases. Further, in the case where the fins 51 are correspondingly arranged to the electrode portions 4, the heat radiation performance improves and unevenness of temperature between the battery modules 5 reduces. Accordingly, the performance of the battery unit 100 improves.

In the case where the battery unit 100 has the fins 51, the heat radiation area increases. In this case, therefore, it is not always necessary to provide clearances between the battery modules 5 as air passages. If the battery modules 5 are stacked without the clearances as the air passages, the size of the module assembly 1 is reduced. Also, because parts for providing the clearances between the battery modules 5 are not necessary, the number of assembling steps and the number of parts reduce.

In the case where the outlet ports 37 are disposed to open to the upper portion of the battery housing 2 and at the substantially same height as the fins 51, the volume of air passing through the fins 51 is increased. That is, the cooling performance and the heating performance improve. Further, since the air passage from the outlet ports 37 to the fins 51 is linearly provided, the resistance to flow of the air is reduced.

The discharge port 26 of the battery housing 2 is disposed on the side wall 2c that is opposed to the side wall 2b to which the outlet port 37 of the blower 30 is connected in the longitudinal direction Y. In the case where such a configuration is employed, the air passage from the outlet port 37 to the discharge port 26 through the fins 51 is linearly provided. Therefore, the resistance to flow of the air is reduced. In the case where the discharge port 26, the outlet port 37 and the fins 51 are disposed at the substantially same height, the resistance to flow of the air is further reduced and noise reduction is enhanced.

In the case where the fins $51a$, $51b$, $51c$, $51d$ have different surface areas such that the surface areas thereof increase with respect to the flow of the air, the fins $51a$, $51b$, $51c$, $51d$ can have the substantially same amount of heat radiation, though the temperature of air varies in accordance with the position with respect to the longitudinal direction Y. Therefore, the heat exchanging performance can be substantially uniform between the fins $51a$, $51b$, $51c$, $51d$. Accordingly, it is less likely that the cooling performance of the downstream fins will be lower than the cooling performance of the upstream fins. Namely, unevenness of the temperature between the battery modules 5, particularly, in the longitudinal direction Y is reduced, and hence the performance of the battery unit 100 improves.

The surface areas of the fins 51 are determined such that the amount of heat radiation is substantially equal among the upstream most fin $51a$, the middle upstream fin $51b$, the middle downstream fin $51c$ and the downstream most fin $51d$. In this case, the battery unit 100 achieves optimum balance in terms of the cooling performance and the resistance to flow of the air.

The surface areas of the fins 51 are adjusted in various ways. As one example, the surface areas of the fins 51 can be adjusted by varying the length of the fins 51 with respect to the longitudinal direction Y. As another example, the surface areas of the fins 51 can be adjusted by forming louvers on the fins 51 and varying configurations, shapes and the like of the louvers. As further another example, the surface areas of the fins 51 can be adjusted by varying the pitch of the creases of the fins 51.

In the embodiment shown in FIGS. 1 and 2, the middle upstream fin $51b$ and the middle downstream fin $51c$ are integrated. Alternatively, the middle upstream fin $51b$ and the middle downstream fin $51c$ can be configured separately.

In the case where the sensors 25 are correspondingly provided for the battery modules 5 for precisely controlling the battery modules 5, the sensors 25 are wired to the control unit. To lead the wires 27 to the control unit with the compact structure, the wire units 55 are disposed along the upper surface of the module assembly 1. Each of the wire units 55 is disposed to cover at least a part of the upper surface of each battery module 5 other than the electrode portions 4 and to extend over the width of the module assembly 1. Further, the wire unit 55 forms the space 56 continuous in the width direction X therein. Therefore, the wires 27 can be led to the control unit through the space 56.

For example, the wire unit 55 is disposed such that the clearance is provided between its upper wall and the upper inner surface of the battery housing 2 to allow the air to pass through. Accordingly, it is less likely that the flow of air in the passage space will be disturbed by the wire units 55.

In one example, the height H1 of the wire unit 55 is smaller than the height H2 of the fin 51 with respect to the up and down direction Z. This configuration reduces the air passing through the fins 51 from being affected by the wire unit 51 while maintaining the volume of the space 56. In the case where the height H1 of the wire unit 55 is smaller than the height H3 of the electrode portion 4, the wire unit 55 is not located in the air passage area. Therefore, it is less likely that the resistance to flow of the air will be increased.

In general, if the ambient temperature is low at the starting of the battery unit 100, the performance of the battery modules 5 is likely to be lower than that when placed under an ordinary temperature, such as a room temperature. Therefore, in the case where the heating member 60 is provided in the battery unit 100, the battery modules 5 can be effectively heated in such a situation.

The heating member 60 is configured to heat the air blown by the blower 30. In this case, the heated air is blown toward the fins 51. As such, the fins 51 are heated, and hence the battery modules 5 are heated through the fins 51 and the electrode portions 4. Accordingly, when the temperature of the battery modules 5 is lower than a predetermined temperature, the battery modules 5 can be efficiently heated. Therefore, the battery unit 100 exhibits stable performance.

If the heating member 60 is disposed at an upstream position of the blower 30, heated air is suctioned into the blower 30, and thus the blower 30 is heated. In this case, it is difficult to efficiently heat the air blown from the outlet port 37. In one example of the present embodiment, on the other hand, the heating member 60 is disposed at the outlet port 37 of the blower 30. As such, the air blown toward the battery modules 5 can be efficiently heated.

In the case where the heating member 60 is constructed of the electrical heat-generating member, it is possible to heat the air only in a predetermined period of time. Further, when the heating operation of the heating member 60 is stopped, the heating member 60 itself can be cooled by the air generated by the fan 34. Therefore, generation of the air is smoothly restarted. Accordingly, the heating member 60 is easily controlled.

In the case where the above discussed configurations, such as the variation of the surface areas of the fins 51, the arrangement of the wire units 55, and the like, are employed in addition to the heating member 60, it is appreciated that a heating performance of the module assembly 1 further improves.

Second Embodiment

Figure 4:
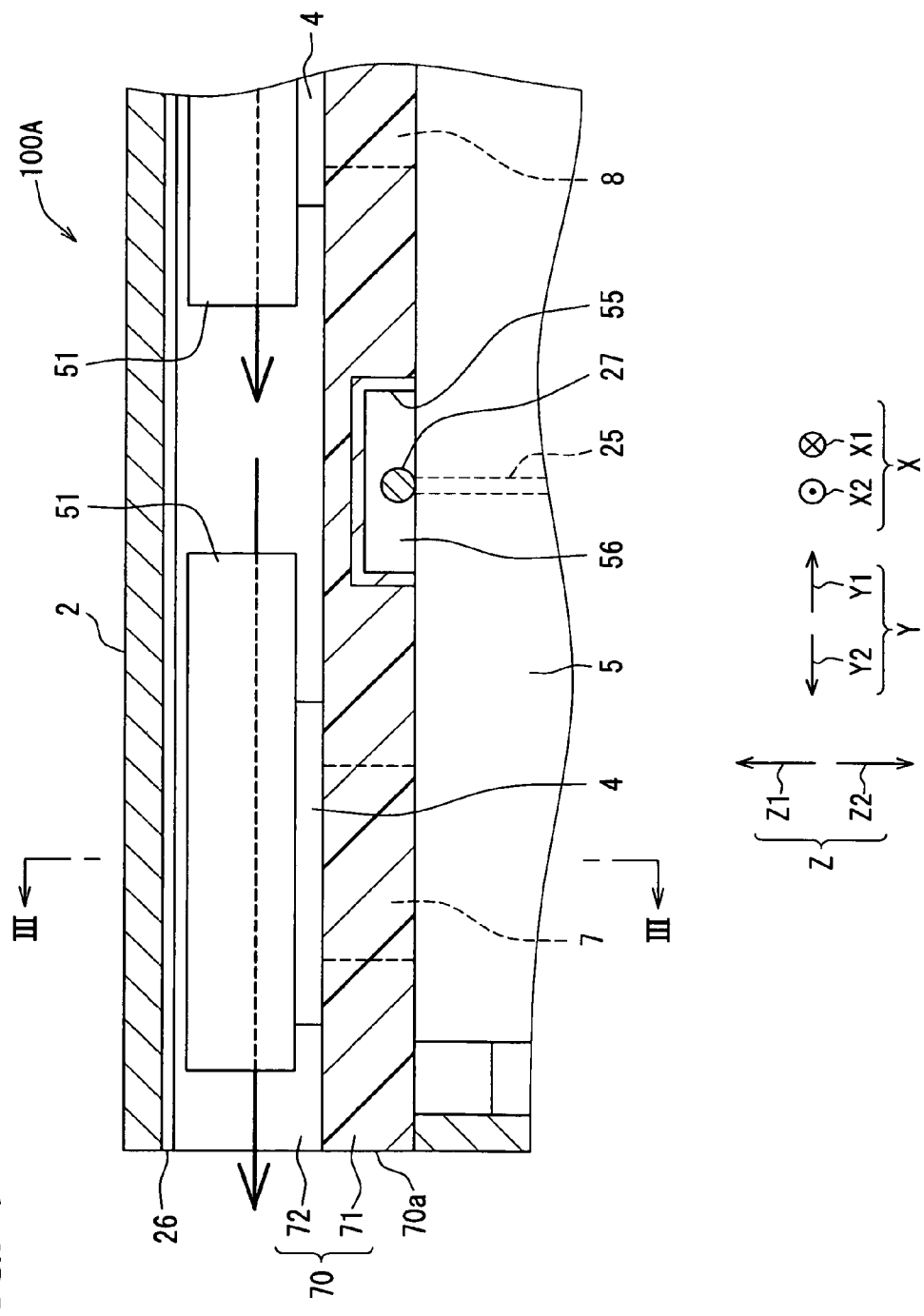
FIG. 4 is a cross-sectional view taken along a line IV-IV in FIG. 3.

Next, a second embodiment of the present invention will be described with reference to FIGS. 3 to 5. Hereinafter, like parts are designated with like reference numerals, and a description thereof will not be repeated. FIG. 3 shows upper portions of the battery modules 5 of a battery unit 100A of the second embodiment, when taken along a line III-III in FIG. 4. FIG. 4 shows an upper portion of the module assembly 1 housed in the battery housing 2, when taken along a line IV-IV in FIG. 3. In FIGS. 3 and 4, the battery modules 5 are only schematically illustrated.

The battery unit 100A of the second embodiment has insulative covering members 70. Structures of the battery unit 100A other than the insulative covering members 70 are similar to those of the battery unit 100 of the first embodiment.

The insulative covering members 70 are filled between the upper surface of the module assembly 1 and the electrode portions 4. The insulative covering members 70 are, for example, made of a resin having insulating properties. The insulative covering members 70 are provided for covering the entirety of the upper surface of the module assembly 1 while filling between the upper surface of the module assembly 1 and the electrode portions 4.

Each of the insulative covering members 70 includes a first insulative portion 71 and second insulative portions 72. The first insulative portion 71 is disposed between the upper surface of the module assembly 1 and the electrode portions 4. The second insulative portions 72 extend from the first insulative portion 71 in the upward direction Z1. Further, upper ends of the second insulative portions 72 are located higher than the upper end of the fin 51 with respect to the up and down direction Z.

The second insulative portions 72 extend from the opposite ends of the first insulative portion 71 with respect to the width direction X. Thus, a space for accommodating the fin 51 and allowing the air to pass through is provided between the second insulative portions 72. The second insulative portions 72 are disposed to separate the adjacent electrode portions 4 in the width direction X. Also, the second insulative portions 72 are disposed to separate the adjacent fins 51 in the width direction X. Further, an end 70a of the insulative covering member 70 is connected to a lower end portion of the discharge port 26 in the second longitudinal direction Y2, as shown in FIG. 4.

In the battery unit 10A, if foreign materials such as dust, droplets and the like are conducted into the battery housing 2 with the air from the blower 30, and further introduced between the adjacent electrode portions 4, unexpected short circuits will occur between the electrode portions 4.

In the case where the insulative covering member 70 is provided to fill between the electrode portions 4 and the upper surface of the module assembly 1, the entry of the foreign materials between the electrode portions 4 and the module assembly 1 is restricted. Accordingly, the unexpected short circuits of the electrode portions 4 are reduced.

Since the insulative covering member 70 has the second insulative portions 72, the space for allowing the air to flow is ensured while insulating the adjacent electrode portions 4 in the width direction X.

Further, it is noted that the end 70a of the insulative covering member 70 is connected to the lower end portion of the discharge port 26 in the second longitudinal direction Y2. As such, even if the foreign materials enter the battery housing 2 with the air, the foreign materials can be discharged from the discharge port 26 with the air passing through the space between the second insulative portions 72. That is, it is less likely that the foreign materials will unexpectedly enter the clearances around the battery modules 5.

In the present embodiment, although the upper surface of the module assembly 1 is entirely covered with the insulative covering member 70, since the fins 51 are exposed to the air passage, the battery modules 5 can be sufficiently cooled. In a case where the battery unit 100A employs the heating members 60, similar to the first embodiment, the battery modules 5 can be sufficiently heated.

The shape of the insulative covering member 70 is not limited to the above discussed shape, but can be modified in different ways. FIG. 5 shows another example of the insulative covering member.

An insulative covering member 170 shown in FIG. 5 has the first insulative portion 71, similar to the insulative covering member 70 shown in FIGS. 3 and 4. However, the insulative covering member 170 does not have the second insulative portions 72. Instead, insulative walls 73 are provided between the battery modules 5, which are adjacent in the width direction X.

Each of the insulative walls 73 extends in the up and down direction Z and an upper end thereof is located higher than the upper end of the fin 51, similar to the second insulative portion 72. Further, the insulative walls 73 are disposed such that the space for the fins 51 and for allowing the air to pass through is provided between the adjacent insulative portions 73. Also in this case, the similar effects as the case shown in FIGS. 3 and 4 are achieved.

In the examples shown in FIGS. 3 and 5, the insulative covering members 70, 170 are disposed to entirely cover the upper surface of the module assembly 1. In the present embodiment, however, it is not always necessary that the upper surface of the module assemble 1 is entirely covered with the insulative covering members 70, 170. For example, the insulative covering members 70, 170 can be disposed to partly cover the upper surface of the module assembly 1. The insulative covering members 70, 170 are disposed to cover at least the vicinities of the electrode portions 4 of the battery modules 5. Also in such a case, the unexpected short circuits are reduced.

Third Embodiment

Figure 6:
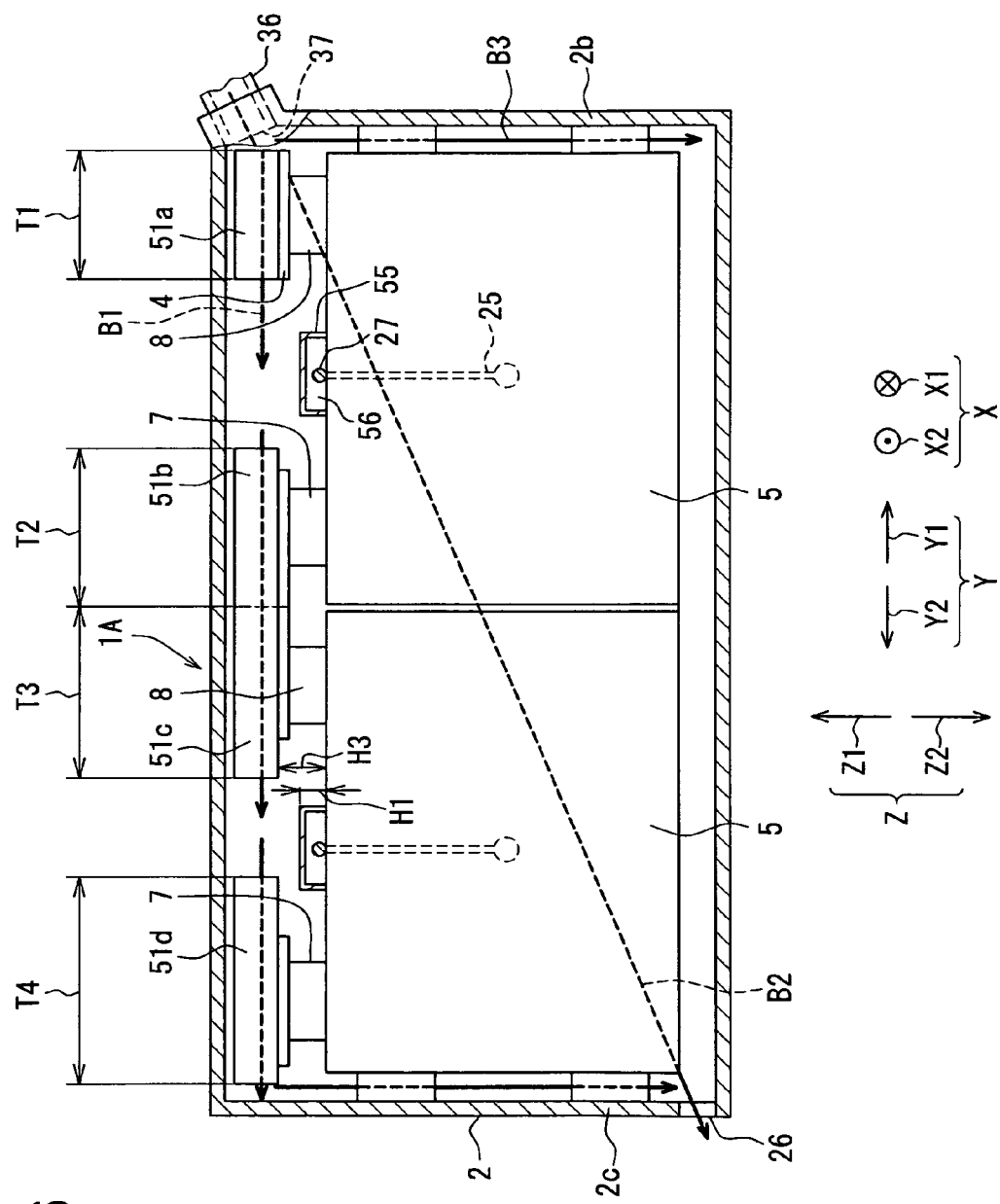
FIG. 6 is a schematic side view of a battery unit according to a third embodiment of the present invention.

A third embodiment of the present invention will now be described with reference to FIG. 6. Hereinafter, like parts are denoted with like reference numerals, and a description thereof will not be repeated. Although not illustrated in FIG. 6, clearances are provided between the adjacent battery modules 5 in the width direction X.

In a module assembly 1A of the present embodiment, the battery modules 5 are arranged over the width direction X while maintaining predetermined clearance between them. The blower 30 is connected to the battery housing 2 such that the air blown out from the outlet port 37 flows diagonally in the battery housing 2, such as from an upper portion of the side wall 2b toward a lower portion of the side wall 2c. The battery housing 2 has the discharge port 26 at the lower portion of the side wall 2c. For example, the tubular portion 36 is connected to the battery housing 2 such that the outlet port 37 faces a diagonally downward direction.

In this case, the air blown out from the outlet port 37 passes through the cooling fins 51 for cooling the fins 51, as shown by arrow B1. In addition, the air blown out from the outlet port 37 passes through the clearances provided between the battery modules 5, which are adjacent in the width direction X, as shown by an arrow B2. Thus, the battery modules 5 can be cooled by the air passing through the clearances. The air is then discharged from the battery housing 2 through the discharge port 26.

In the present embodiment, the air blown out from the outlet port 37 effectively cools the module assembly 1A while passing through various routes as shown by arrows B1 to B3, the cooling performance of the battery modules 5 improves. Also, in the case where the battery unit 100 employs the heating members 60, similar to the first embodiment, the heating performance of the battery modules 5 improves.

Other Embodiments

In the above exemplary embodiments, the battery unit 100, 100A is exemplarily mounted in the vehicle such that the rotation shaft 32 extends in the substantially horizontal direction. However, the arrangement direction of the battery unit 100, 100A is not limited to the above. The battery unit 100, 100A may be arranged in various directions in accordance with a shape or size of a provided space in the vehicle. For example, the battery unit 100, 100A may be mounted such that the outlet port 37 is located above the battery housing 2 while the outlet port 37 extending in the horizontal direction. As another example, the battery unit 100, 100A may be mounted such that the rotation shaft 32 extends in the up and down direction.

In the above embodiments, each casing 33 has suction openings 38, 39 on both sides with respect to the axial direction of the rotation shaft 32. Alternatively, each casing 33 can have one suction opening on one of the sides thereof. Further, the number of fans 34 is not limited to two. Also, the number of the outlet ports 37 is not limited to two.

The present invention may be implemented in various combinations of the above embodiments. Further, the present invention may be implemented by employing portions of the above embodiments in various combinations.

Additional advantages and modifications will readily occur to those skilled in the art. The invention in its broader term is therefore not limited to the specific details, representative apparatus, and illustrative examples shown and described.

What is claimed is:
1. A battery unit comprising:
   a battery housing;
   a module assembly disposed in the battery housing, the module assembly including a plurality of battery modules, the battery modules being stacked and having positive terminals and negative terminals, the module assembly defining a first surface extending along a stacking direction in which the battery modules are stacked and a second surface opposite to the first surface and extending along the stacking direction, the positive terminals and the negative terminals being disposed on the first surface;
   electrode portions disposed on the positive terminals and the negative terminals of the battery modules, and electrically connecting the positive terminals and the negative terminals of the battery modules;
   a blower disposed to oppose a side wall of the battery housing, the side wall extending along the stacking direction without facing the first surface and the second surface of the module assembly, the blower having a rotation shaft that is located between a first plane and a second plane, the first plane including the first surface of the module assembly, the second plane including the second surface of the module assembly; and
   a plurality of fins disposed along the electrode portions, wherein
   the blower is configured such that air is supplied toward the fins over a range substantially equal to a dimension of the module assembly with respect to the stacking direction,
   the plurality of fins includes a plurality of sets of fins, each set of fins including a first fin immediately adjacent an upstream end of the battery housing with respect to a direction of a flow of air, a second fin immediately adjacent a downstream end of the battery housing with respect to the flow of air and a third fin disposed between the first fin and the second fin; and
   the second fin having a length greater than a length of said first fin in the direction of the flow of air to provide a surface area greater than a surface area of said first fin without reducing a cross-sectional area of the flow of air in a plane perpendicular to the direction of the flow of air, the battery unit further comprising:
   an accommodation member disposed along the first surface of the module assembly to cover at least a portion of the first surface other than the electrode portions;
   sensors disposed in the battery modules; and
   wires extending from the sensors, wherein
   the accommodation member extends in the stacking direction and provides an accommodation space therein for accommodating the wires in the stacking direction,
   the accommodation member has a wall opposed to the first surface of the module assembly across the accommodation space, and a distance between the first surface of the module assembly and the opposed wall is smaller than a distance between the first surface of the module assembly and the fins.

2. The battery unit according to claim 1, further comprising:
an insulative member disposed between the first surface of the module assembly and the electrode portions.

3. The battery unit according to claim 1, wherein
the battery modules are stacked with predetermined clearances therebetween, and
the module assembly and the blower are configured such that a first air path and a second air path are provided in the battery housing, the first air path passing through the fins, the second air path passing through the predetermined clearances provided between the battery modules.

4. The battery unit according to claim 3, wherein
the battery housing has an inlet port on the side wall to which the blower is connected and a discharge port through which the air flows out from the battery housing, and
the inlet port and the discharge port are disposed at diagonally opposite locations.

5. The battery unit according to claim 1, further comprising:
a heating member, wherein
the blower has a casing and a fan housed in the casing, and
the heating member is disposed at a downstream portion of the casing for heating air generated by the fan.

6. The battery unit according to claim 1, wherein:
the first surface is spaced from an inner surface of the battery housing to provide a passage space between the module assembly and the inner surface of the battery housing;
the blower supplies air toward the passage space of the battery housing over a dimension of the module assembly with respect to the stacking direction; and
the wall of the accommodation member is spaced from the inner surface of the battery housing to provide the passage space for allowing the air to flow.

7. The battery unit according to claim 1, wherein:
an insulative member includes a first insulative portion and a second insulative portion,
the first insulative portion disposed along the first surface of the module assembly,
the second insulative portion disposed between the fins and electrode portions, which are adjacent in the stacking direction.

8. The battery unit according to claim 7, wherein
the battery housing has a discharge port through which the air generated by the blower flows out from the battery housing,
an end of the insulative member is connected to a perimeter of the discharge port.

9. The battery unit according to claim 1, further comprising:
a heating member disposed to heat air generated by the blower.

10. The battery unit according to claim 9, wherein
the blower includes a casing and at least one fan disposed in the casing,
the casing has an outlet port connected to the side wall of the battery housing for introducing the air into the battery housing, and
the heating member is disposed downstream of the fan and upstream of the fins.

11. The battery unit according to claim 9, further comprising:
an insulative member disposed between the first surface of the module assembly and the electrode portions.

12. The battery unit according to claim 9, wherein
the battery modules are stacked with predetermined clearances therebetween, and
the module assembly and the blower are configured such that a first air path and a second air path are provided in the battery housing, the first air path passing through the fins, the second air path passing through the predetermined clearances provided between the battery modules.

13. The battery unit according to claim 1, wherein
the positive terminal and the negative terminal of each of the battery modules are spaced from each other with respect to the flow direction of the air, and
the accommodation member is disposed on the first surface of the module assembly between the positive terminal and the negative terminal.

14. The battery unit according to claim 1, wherein
each of the fins has a corrugate shape, and is disposed such that grooves of the corrugate shape extends in the flow direction of the air.

15. The battery unit according to claim 1, wherein
the first surface is spaced from an inner surface of the battery housing to provide a passage space between the module assembly and the inner surface of the battery housing,
the fins are disposed in the passage space,
the blower includes a blower casing and a fan housed in the blower casing,
the blower casing has an outlet port connected to the battery housing,
the output port is located at a substantially same level as the fins and faces the first fin.

16. The battery unit according to claim 1, wherein each of the plurality of fins has a corrugated shape, and is disposed such that grooves of the corrugated shape extend in the direction of flow of the air, the grooves having a constant width.

17. The battery unit according to claim 1, wherein the air that is supplied toward the fins does not flow through the accommodation space.

18. The battery unit according to claim 1, wherein the accommodation space is separated from a passage space through which the flow of air flows.

* * * * *